(No Model.)
C. C. CANER.
VEHICLE RUNNING GEAR.
No. 376,510. Patented Jan. 17, 1888.
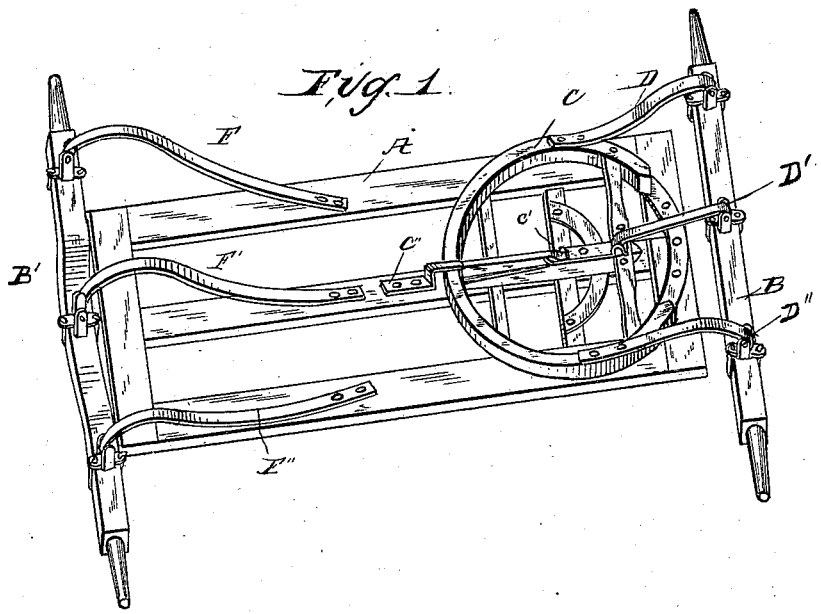
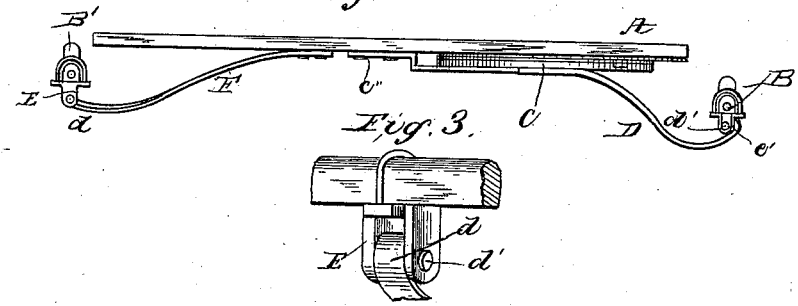
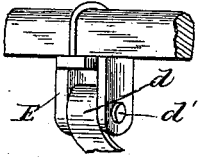
ATTEST—
Wm. H. Scott
C. M. Werle
INVENTOR—
Chris. C. Caner,
per O. Ed. Duffy
Atty.
N. PETERS, Photo-Lithographer, Washington, D. C.

UNITED STATES PATENT OFFICE.

CHRISTOPHER C. CANER, OF PATASKALA, OHIO.

VEHICLE RUNNING-GEAR.

SPECIFICATION forming part of Letters Patent No. 376,510, dated January 17, 1888.

Application filed March 30, 1887. Serial No. 233,032. (No model.)

*To all whom it may concern:*

Be it known that I, CHRISTOPHER C. CANER, of Pataskala, in the county of Licking and State of Ohio, have invented certain new and useful Improvements in Vehicle Running-Gears; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to running-gear for vehicles; and the invention consists in the combination, with a vehicle-body, of a fifth-wheel located in rear of the front axle and specially-arranged springs.

The invention further consists in the details of construction and combination of parts, hereinafter fully described, and pointed out in the claims.

In the accompanying drawings, Figure 1 is a perspective view taken from the under side of the vehicle. Fig. 2 is a side view of the same, and Fig. 3 is a detail view of the connection between the spring and axle.

A represents the bottom of the vehicle-body; B B', the axles, and C the fifth-wheel. It will be seen that the axles B B' are not placed under the wagon-body, and this feature I will now explain.

The fifth-wheel C is located in rear of the front end of the vehicle-body, and it is secured to the under side of the body A by a pivot, C', and an arm, C''. Secured to the wheel C are two springs, D D''. The springs D and D'' are extended obliquely forward, and at the same time deflected downwardly a little, as illustrated in Fig. 2 of the drawings. They are then curved upwardly and turned upon themselves to form loops $d$. The loop $d$ engages a pin, $d'$, passed through the lower end of the bracket E, secured to the axle B.

D' is a link having loose joints with the front axle and fifth-wheel, so as to prevent a rigid connection between the body and axles and to allow motion when necessary.

The rear springs, F, F', and F'', are arranged relatively the same as the front springs, except that the joint between the spring F' and the body is rigid.

It will be evident from the foregoing description that the body of the vehicle constructed in accordance with it will be nearer the ground than ordinary, making it more convenient to get in and alight from the wagon, and also when the front wheels are turned at an angle they will not interfere with a person getting in and out of the wagon.

Locating the fifth-wheel in the rear of the front axle, as shown, and the axles in front of the body, and extending the springs so far beyond the sides of the body allows a very short turn to be made and renders the vehicle very convenient for crowded or narrow thoroughfares.

Another advantage is obtained by arranging the side springs at an angle to the axles, as shown in Fig. 1. By this arrangement the "pitching" of a wagon on a rough road is prevented, and the body is also retained in a level position regardless of unequal weights being placed on the sides of the wagon.

Having fully described my invention, what I claim as new, and desire to secure by Letters Patent, is—

1. In a vehicle, the combination, with the body and fifth-wheel secured to the bottom thereof, of a front axle located forward of the body and wheel, springs having one end secured to the fifth-wheel and the other end pivotally secured to the said axle at points outside the plane of the sides of the body, and a link loosely jointed to the fifth-wheel and the axle at points intermediate of said springs, substantially as specified.

2. The combination, with the body of a vehicle and axles located beyond the front and rear ends thereof, of a fifth-wheel secured to the bottom of said body, springs secured to said wheel and pivotally secured to the front axle at points outside the plane of the sides of the body, a link loosely jointed to said wheel and front axle, and springs secured to said body and pivotally secured to the rear axle, the outer springs being secured to the axle at points outside the plane of the sides of the body, substantially as specified.

In testimony that I claim the foregoing as my own I affix my signature in presence of two witnesses.

CHRISTOPHER C. CANER.

Witnesses:
DAVID ROCKEY,
A. LYONS.